(12) United States Patent
Fujino et al.

(10) Patent No.: US 8,461,707 B2
(45) Date of Patent: Jun. 11, 2013

(54) WIND TURBINE GENERATOR AND NACELLE TURNING METHOD

(75) Inventors: Yasuto Fujino, Tokyo (JP); Seita Seki, Tokyo (JP); Yoshiyuki Hayashi, Tokyo (JP); Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 11 days.

(21) Appl. No.: 12/674,924

(22) PCT Filed: Feb. 8, 2010

(86) PCT No.: PCT/JP2010/051775
§ 371 (c)(1),
(2), (4) Date: Aug. 21, 2010

(87) PCT Pub. No.: WO2011/096078
PCT Pub. Date: Aug. 11, 2011

(65) Prior Publication Data
US 2011/0309620 A1    Dec. 22, 2011

(51) Int. Cl.
*F03D 9/00* (2006.01)
(52) U.S. Cl.
USPC ............................................... 290/44; 290/55
(58) Field of Classification Search
USPC ............................................... 290/44, 55
See application file for complete search history.

(56) References Cited

U.S. PATENT DOCUMENTS

| | | | |
|---|---|---|---|
| 7,436,083 B2 * | 10/2008 | Shibata et al. | 290/44 |
| 7,445,420 B2 * | 11/2008 | Yoshida | 415/4.3 |
| 2008/0084068 A1 | 4/2008 | Shibata et al. | |
| 2008/0131279 A1 | 6/2008 | Behnke et al. | |
| 2011/0057451 A1 * | 3/2011 | Volmer et al. | 290/55 |

FOREIGN PATENT DOCUMENTS

| | | |
|---|---|---|
| CN | 1549897 A | 11/2004 |
| EP | 0945613 A2 | 9/1999 |
| EP | 1 429 025 | 6/2004 |
| JP | 2005-320891 A | 11/2005 |
| JP | 2006-307653 A | 11/2006 |
| JP | 2007-64062 | 3/2007 |
| JP | 3978186 B2 | 9/2007 |

OTHER PUBLICATIONS

International Search Report for PCT/JP2010/051775, mailed Apr. 13, 2010.
Australian Office Action for AU 2010226901, mailed May 12, 2011.
Office Action mailed on Apr. 25, 2012 in Korean Application No. 2010-7021948 with partial English translation.

(Continued)

*Primary Examiner* — Tho D Ta
(74) *Attorney, Agent, or Firm* — Kanesaka Berner & Partners, LLP

(57) ABSTRACT

A wind turbine generator is provided with: a nacelle mounting a wind turbine rotor; a yaw drive device generating drive force for causing yaw turning of the nacelle; a brake mechanism generating braking force for braking the turning of the nacelle; a control system controlling the yaw drive device and the brake mechanism; and a wind speed measurement device measuring wind speed. When detecting occurrence of a high wind speed state based on the wind speed while the nacelle is turned by the yaw drive device, the control device provides braking force for the nacelle by using the brake mechanism in response to the detection of the occurrence of the high wind speed state.

5 Claims, 9 Drawing Sheets

OTHER PUBLICATIONS

Korean Notice of Allowance for Application No. 10-2010-7021948 mailed Aug. 27, 2012.

Japanese Notice of Allowance for Application No. 2010-525556 mailed Aug. 21, 2012.

Australian Notice of Acceptance for Application No. 2010226901 mailed Sep. 12, 2012.

Australian Patent Examination Report for Application No. 2010226901 mailed Jul. 6, 2012.

International Preliminary Report on Patentability issued Sep. 18, 2012.

Office Action issued in corresponding Chinese Application No. 201080001339.3 as mailed on Mar. 1, 2013 (Chinese Language and Partial English translation).

* cited by examiner

WIND TURBINE GENERATOR AND NACELLE TURNING METHOD

RELATED APPLICATIONS

The present application is a National Phase of International Application Number PCT/JP2010/051775, filed Feb. 8, 2010, the disclosure of which is hereby incorporated by reference herein in its entirety.

TECHNICAL FIELD

The present invention relates to a wind turbine generator and a nacelle turning method, and especially relates to the yaw control of the nacelle of a wind turbine generator.

BACKGROUND ART

The direction of a nacelle of a wind turbine generator is required to be controlled in the horizontal plane in accordance with the wind direction and speed. Such control is generally referred to as a yaw control, and a mechanism for carrying out the yaw control is generally referred to as a yaw control mechanism. A yaw control mechanism typically includes yaw drive devices for generating drive force to turn the nacelle in a desired direction and yaw brakes for securing the nacelle in the direction after the nacelle is directed in the desired direction. Most typically used as a yaw drive device is a drive mechanism which is configured to drive a pinion gear engaged to a gear provided on a tower with a yaw motor and a reducer. Such wind turbine generator is disclosed, for example, in United States Patent Application Publication No. US 2008/0131279 A1. On the other hand, most commonly used as the yaw brake is a hydraulic brake. The wind turbine generator using a hydraulic brake as the yaw brake is disclosed, for example, in Japanese Unexamined Patent Publication No. JP 2006-307653A.

Generally, a yaw drive device is designed to be able to generate a drive force sufficient to turn the nacelle in a sudden strong wind that occurs only once in 50 years (referred to as 50-year gust, which has a wind speed of 35 m/s or more, for example). This aims to allow a wind turbine rotor to face upwind even in a case where any strong wind occurs. It is desirable to face the wind turbine rotor upwind to reduce the wind load in the strong wind, since the wind turbine generator generally has a smallest wind load, when the wind turbine rotor is on the windward. The wind turbine rotor can be faced upwind to reduce the wind load in almost all cases, when the wind turbine generator is designed to generate drive force sufficient to turn the nacelle in the 50-year gust.

Here, according to an inventors' study, occurrence of such a sudden strong wind as the 50-year gust is very rare through a generally-demanded 20-year lifetime of a wind turbine, and the above-mentioned specification of the yaw control mechanism provides overquality for normal operation. Such specification of the yaw control mechanism undesirably leads to a high cost. Consequently, the inventors are considering a design in which the drive force of the yaw control mechanism is reduced, allowing the nacelle to be unable to be turned in a case where sudden wind external force has occurred.

The reduction in the drive force of the yaw drive device, however, may cause damage to the yaw motor when an instant unsteady wind occurred while the nacelle is turned to face the wind turbine rotor upwind. Specifically, when an instant unsteady wind such as the 50-year gust occurs during the turning of the nacelle, the nacelle may be pushed back instantaneously because of shortage of the turning torque. On this occasion, the nacelle is turned instantaneously at a high speed. Since the drive force of the yaw motor is transferred to the nacelle generally via the reducer, the yaw motor may be damaged because of the excessive rotation, when the nacelle is turned instantaneously at a high speed.

CITATION LIST

Patent Literatures

Patent Document 1: United States Patent Application Publication No. US2008/0131279 A1
Patent Document 2: Japanese Unexamined Patent Publication No. JP 2006-307653

SUMMARY OF INVENTION

Therefore, an object of the invention is to provide a technique for effectively avoiding damage of a yaw motor which may be caused when a nacelle has been pushed back by a strong wind.

In an aspect of the present invention, a wind turbine generator includes; a nacelle mounting a wind turbine rotor; a yaw drive device generating driving force causing yaw turning of the nacelle; a brake mechanism for generating braking force used for braking the turning of the nacelle; a control device controlling the yaw drive device and the brake mechanism; and a wind speed measurement device measuring wind speed. When detecting occurrence of a high wind speed state on the basis of the wind speed while the nacelle is tuned by the yaw drive device, the control device provides the braking force to the nacelle by using the brake mechanism in response to the detection of the occurrence of the high wind speed state. In one embodiment, the control system controls the brake mechanism so as not to apply braking force to the nacelle when the occurrence of the high wind speed state is not detected during the turning of the nacelle.

On this occasion, it is preferable that a drive torque $Mzt_{ALL}$ generated by the yaw drive device and a brake torque $Mzt_{BRK}$ generated by the brake mechanism are adjusted so as to satisfy the following relationship for a torque (absolute value) $|Mzt|_{MAX}$ acting the nacelle in a 50-year gust:

$$Mzt_{ALL} - Mzt_{BRK} < |Mzt|_{MAX} < Mzt_{ALL} + Mzt_{BRK}.$$

In one embodiment, the wind turbine generator further includes a sudden turning detection device detecting sudden turning of the nacelle caused by the wind. In this case, it is preferable that the control system controls the brake mechanism so as to apply greater braking force than the braking force applied in response to the detection of the occurrence of the high wind speed state, when the sudden turning of the nacelle is detected in the turning of the nacelle.

It is preferable that the yaw drive device includes: a yaw motor; a turn mechanism turning the nacelle by using the torque generated by the yaw motor; and a torque control device controlling the torque generated by the yaw motor.

In another aspect of the present invention, a nacelle turning method of a wind turbine generator includes steps of: monitoring a wind speed during turning of a nacelle; and detecting occurrence of a high wind speed state on the basis of the wind speed and applying brake force to the nacelle in response to the detection of the occurrence of the high wind speed state.

The present invention effectively avoids damage of the yaw motor which may be caused when the nacelle is pushed back by a strong wind, allowing effective use of the drive force of the yaw drive device.

DESCRIPTION OF EMBODIMENTS

Figure 1:
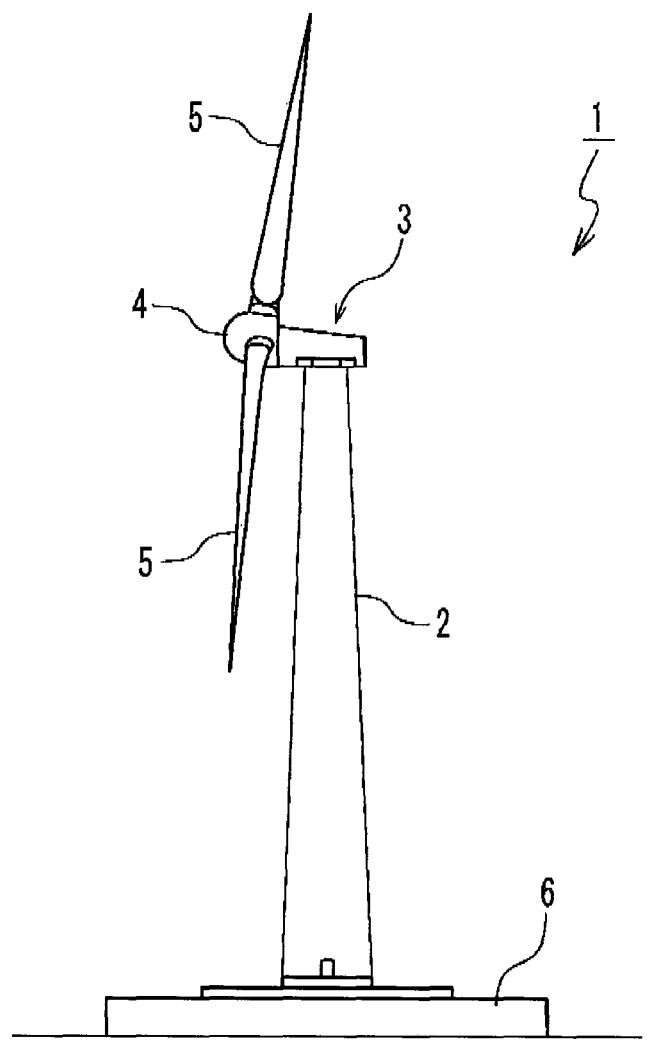
FIG. 1 is a side view showing the configuration of a wind turbine generator in one embodiment of the present invention.

FIG. 1 is a side view showing the configuration of a wind turbine generator 1 in one embodiment of the present invention. The wind turbine generator 1 includes a tower 2 built on a base 6, a nacelle 3 disposed on the top of the tower 2, a rotor head 4 rotatably attached to the nacelle 3, and wind turbine blades 5 attached to the rotor head 4. The rotor head 4 and the wind turbine blades 5 constitute a wind turbine rotor. When the wind turbine rotor is rotated by the wind power, the wind turbine generator 1 generates electric power and supplies the electric power to a power grid connected to the wind turbine generator 1.

Figure 2:
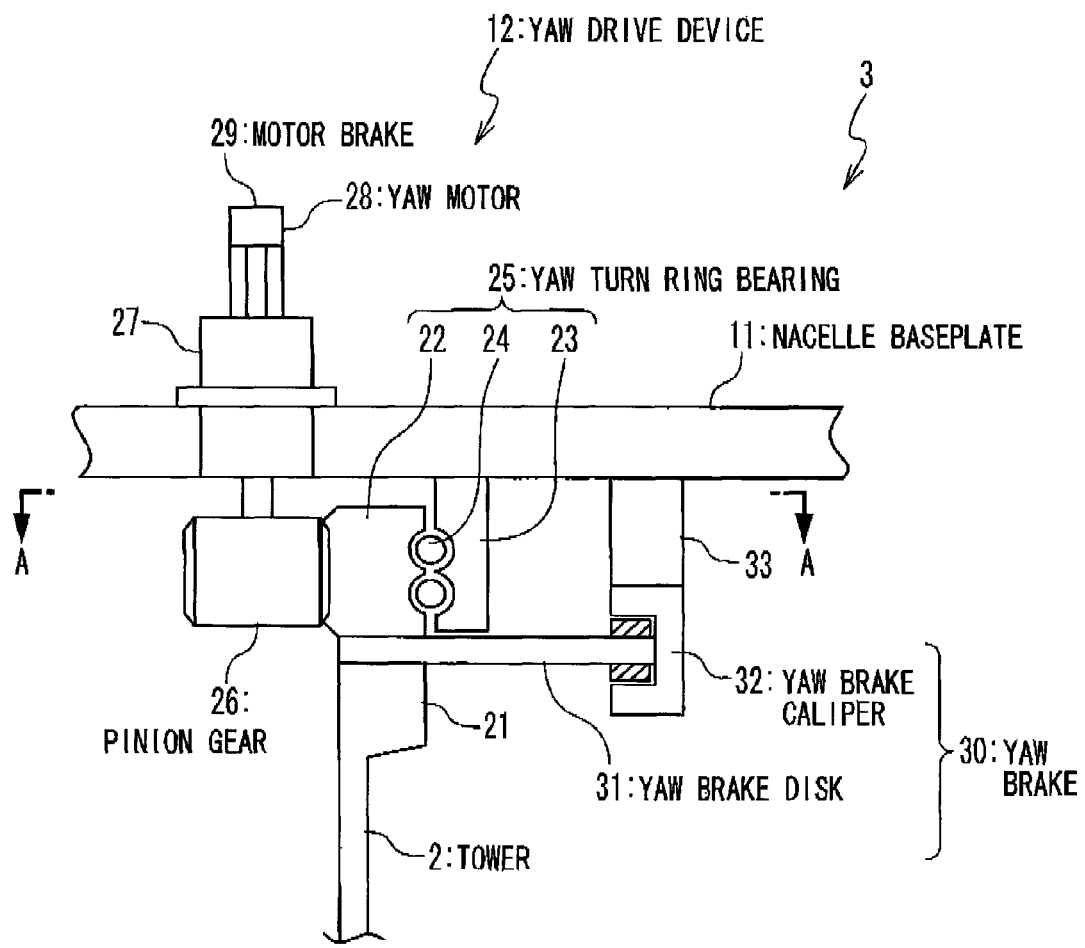
FIG. 2 is a cross sectional view showing the configuration of a yaw control mechanism in one embodiment of the present invention.

FIG. 2 is a view showing the configuration of a yaw control mechanism for carrying out the yaw control of the nacelle 3. Referring to FIG. 2, the nacelle 3 includes a nacelle baseplate 11 to mount thereon a main shaft, a speed-up gear, a power generator, and other mechanisms used for the power generation, and yaw drive devices 12 are attached to the nacelle baseplate 11.

The tower 2 is provided with a bearing attachment portion 21 on the top, and an outer ring 22 is attached to the bearing attachment portion 21. In addition, an inner ring 23 is attached to the bottom surface of the nacelle baseplate 11. Arranged between the outer ring 22 and the inner ring 23 are steel balls 24 are, and the outer ring 22, the steel balls 24, and the inner ring 23 constitute a yaw turn ring bearing 25. The yaw turn ring bearing 25 allows the nacelle baseplate 11 to be turned in the horizontal plane. Gear teeth are formed on the outer surface of the outer ring 22.

Figure 3:
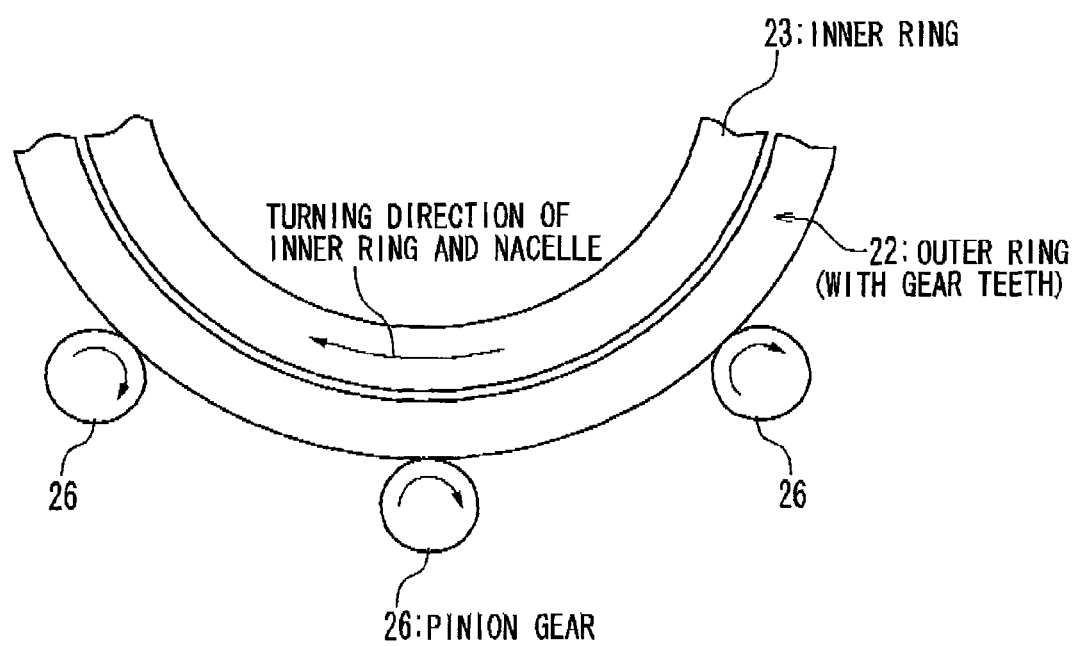
FIG. 3 is a top view showing arrangements of an inner ring, an outer ring, and a pinion gear in the yaw control mechanism of FIG. 2.

The yaw drive devices 12 each include a pinion gear 26, a reducer 27, a yaw motor 28, and a motor brake 29. The pinion gear 26 is engaged to the gear surface provided on the outer surface of the outer ring 22, and the rotation of the pinion gear 26 causes the nacelle 3 and the inner ring 23 attached thereto to be turned as shown in FIG. 3. That is, the outer ring 22 also works as a circular gear engaged to the pinion gear 26. In FIG. 3, the relationship between the rotational direction of the pinion gear 26 and the turning direction of the nacelle 3 and the inner ring 23 is illustrated. Referring back to FIG. 2, the pinion gear 26 is coupled to the output shaft of the reducer 27. The reducer 27 is configured to transmit the rotation of the input shaft to the output shaft with the rotation speed reduced, and the input shaft of the reducer 27 is coupled with the rotor of the yaw motor 28. This implies that the pinion gear 26 is mechanically coupled with the rotor of the yaw motor 28 via the reducer 27.

The motor brake 29 has a function to provide a braking force to the rotor of the yaw motor 28. Since the rotor of the yaw motor 28 is mechanically coupled with the pinion gear 26, the yaw turning of the nacelle 3 is subjected to braking with the braking force provided by the motor brake 29. In one embodiment, an electromagnetic brake of a non-excitation operation type, which operates upon a termination of exciting current supply, may be used as the motor brake 29. Instead, an electromagnetic brake configured to operate upon an exciting current supply may be used as the motor brake 29.

In this embodiment, a yaw brake 30 is provided as means which provides braking of the yaw turning of the nacelle 3, in addition to the motor brakes 29. The yaw brake 30, which is a braking mechanism providing braking for the yaw turning of the nacelle 3 with hydraulic pressure, includes a yaw brake disk 31 and yaw brake calipers 32. The yaw brake disk 31 is attached to the tower 2, and the yaw brake calipers 32 are attached to the nacelle baseplate 11 by an attachment bracket 33. The yaw brake calipers 32 are driven with hydraulic pressure to catch the yaw brake disk 31, and thereby the yaw turning of the nacelle 3 is subjected to braking.

Although the yaw drive devices 12 are attached to the nacelle baseplate 11 in this embodiment, it would be understood that the yaw drive devices 12 may be attached to the tower 2. In this case, gear teeth are formed on the inner surface of the inner ring 23, and the pinion gears 26 are engaged to the gear teeth. Also, the yaw brake disk 31 may be attached to the nacelle baseplate 11 with the yaw brake calipers 32 attached to the tower 2.

Figure 4:
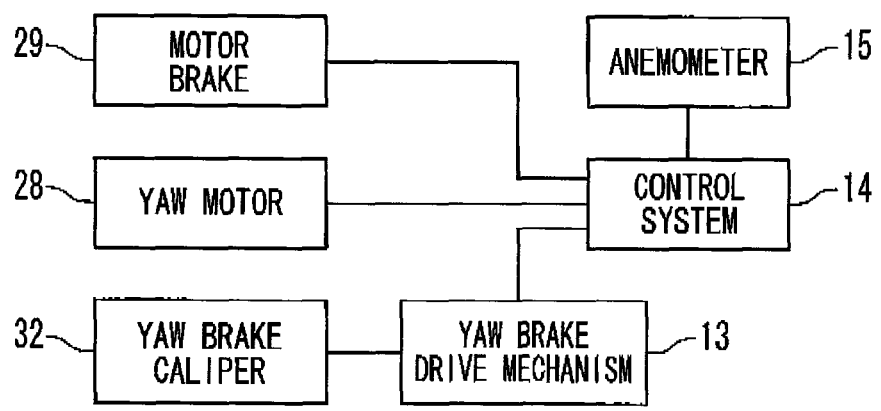
FIG. 4 is a block diagram showing the configuration of a control system of the yaw control mechanism in one embodiment of the present invention.

FIG. 4 is a block diagram showing the configuration of a control system of the yaw control mechanism in this embodiment. In this embodiment, the wind turbine generator 1 includes a yaw brake drive mechanism 13, a control system 14, and an anemometer 15. The yaw brake drive mechanism 13 drives the yaw brake calipers 32 with hydraulic pressure. The control system 14 controls the turning and stopping of the nacelle 3 in response to the wind direction and speed measured by the anemometer 15. The control of the turning and stopping of the nacelle 3 is carried out by operating the yaw motors 28, the motor brakes 29 and the yaw brake calipers 32.

When securing the nacelle 3 (that is, when the nacelle 3 is not turned), the control system 14 provides braking for the nacelle 3 by operating the motor brakes 29 and the yaw brake calipers 32.

When the nacelle 3 is turned, on the other hand, the control system 14 operates the yaw motors 28. The drive forces generated by the yaw motors 28 are transmitted to the pinion gears 26 via the reducers 27, and thereby the nacelle 3 is turned. Basically, the motor brakes 29 and yaw brake calipers 32 are released while the nacelle 3 is turned.

During the turning of the nacelle 3, the control system 14 monitors the wind speed measured by the anemometer 15, and the operation is placed into a mode (high wind speed mode) in which the nacelle 3 is turned with the motor brakes 29 and/or the yaw brake calipers 32 operated, when the control system 14 judges that the wind speed is in a high wind speed state. Such control suppresses occurrence of a situation where the nacelle 3 is pushed back instantaneously when an instant unsteady wind occurs, and accordingly prevents a damage of the yaw motor 28 which may be caused by the excessive rotation. The braking force applied to the nacelle 3 in the high speed wind state is smaller than that applied to the nacelle 3 for securing the nacelle 3. For example, all of the motor brakes 29 and the yaw brake calipers 32 are operated for securing the nacelle 3, while only the yaw brake calipers 32 may be operated in the case of the high speed wind state. In addition, the braking force generated by the yaw brake calipers 32 in the case of the high speed wind state may be different from the braking force generated by the yaw brake calipers 32 in the case of securing the nacelle 3.

Various logics can be used regarding the judgment in switching to the high speed wind mode. Parameters referred to by the logics may include the average wind speed or the duration. For example, the wind speed may be judged as being in the high speed wind state, when the average wind speed in a past predetermined period becomes larger than a predetermined value. Alternatively, the wind speed may be judged as being in the high speed wind state when the maximum wind speed in a past predetermined period becomes larger than a predetermined value.

When the high wind speed state is gone, the operation is switched to a mode (normal turn mode) in which the motor brake 29 and yaw brake caliper 32 are released. For example, the operation may be switched to the normal turn mode when the condition based on which the operation is switched to the high wind speed mode becomes unsatisfied. Instead, the operation may be switched to the normal turn mode when a state lasts a predetermined duration in which the average wind speed in a past predetermined period is lower than a setting value.

Figure 5:
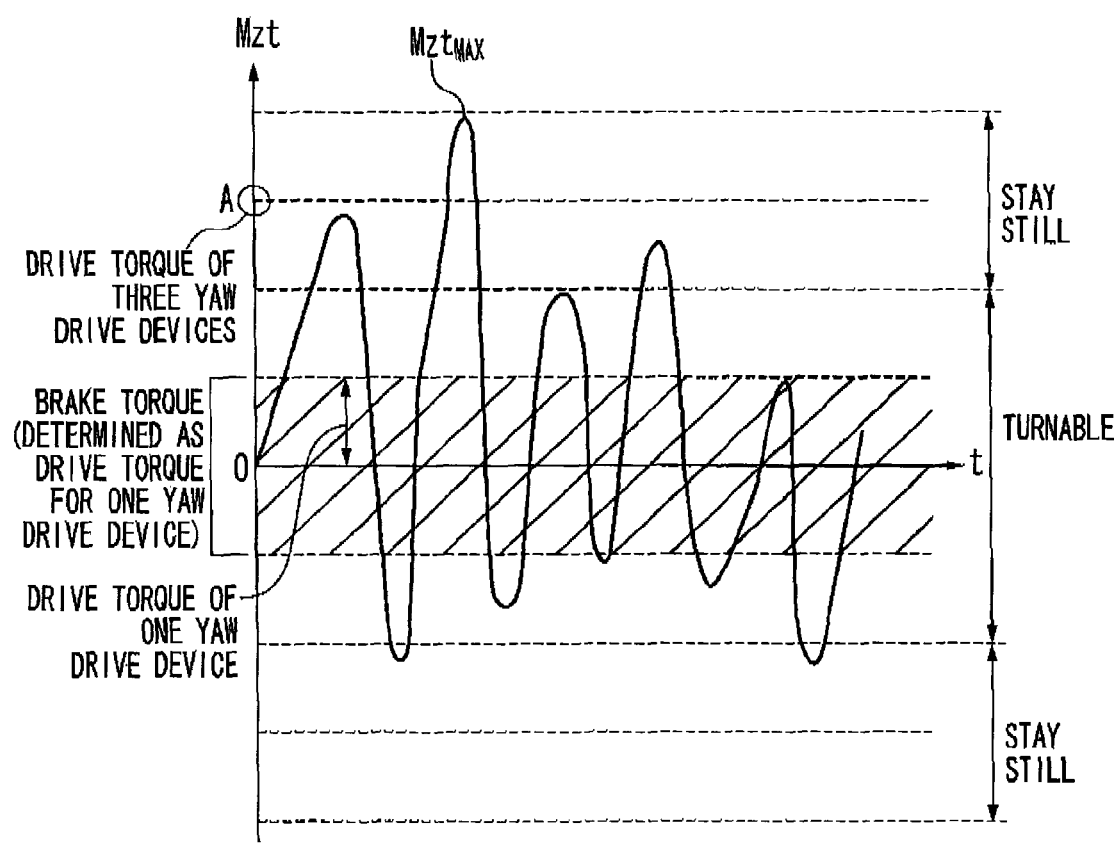
FIG. 5 is a graph showing one example of a yaw control in one embodiment of the present invention.

FIG. 5 is a graph explaining an example of the yaw control in this embodiment. In one embodiment, the drive torque $Mzt_{ALL}$ totally generated by the yaw drive devices 12 and the brake torque $Mzt_{BRK}$ applied to the nacelle 3 in the high speed wind state are adjusted so as to satisfy the following condition:

$$Mzt_{ALL} - Mzt_{BRK} < |Mzt|_{MAX} < Mzt_{ALL} + Mzt_{BRK}, \quad (1)$$

where $|Mzt|_{MAX}$ is the absolute value of the torque applied to the nacelle 3 by a 50-year gust (that is, the maximum torque assumed in the design).

For example, when three yaw drive devices 12 are provided, and the braking force (braking torque) applied to the nacelle 3 in the high speed wind state is set to a torque generated by one yaw drive device 12, the following formulas hold:

$$Mzt_{ALL} = 3Mzt_{DRV}, \quad (2a) \text{ and}$$

$$Mzt_{BRK} = Mzt_{DRV}, \quad (2b)$$

where $Mzt_{DRV}$ is the torque generated by one yaw drive device 12.

In this case, the torque $Mzt_{DRV}$ generated by one yaw drive device 12 (that is, the braking torque applied to the nacelle 3 in the high speed wind state) is adjusted to satisfy the following condition:

$$2Mzt_{DRV} < |Mzt|_{MAX} < 4Mzt_{DRV}. \quad (3).$$

In this case, (a) the nacelle 3 is turned in the case of $Mzt < 2Mzt_{DRV}$, and (b) the nacelle 3 stands still in the case of $2Mzt_{DRV} < Mzt < 4Mzt_{DRV}$, where Mzt is the torque applied to the nacelle 3 by the wind. In each case, the situation where the nacelle 3 is pushed back by the wind does not occur. As thus discussed, the adjustment of the torque generated by the yaw drive devices 12 and the brake torque applied to the nacelle 3 in the high speed wind state so as to satisfy the formula (1) or (3) suppresses the occurrence of the excessive rotation of the yaw motors 28 caused by the pushing back of the nacelle 3.

It should be noted that the motor brakes 29 and the yaw brake calipers 32 are not operated in the low wind speed state (that is, the state not in the high wind speed state) in this embodiment. This aims not to waste the drive force of the yaw motors 28. In a configuration where the braking force is always applied to the nacelle 3, only a part of the drive force of the yaw motors 28 works effectively. This unnecessarily requires an increase in the drive force of the yaw motors 28, and accordingly is not preferable. It should be noted that the problem of the excessive rotation of the yaw motors 28 caused by the pushing back of the nacelle 3 occurs only in the high wind speed state. Then, the motor brake 29 and the yaw brake caliper 32 are operated only in the high wind speed state in this embodiment, and this allows effectively using the drive force of the yaw motors 28.

For further reducing the drive force of the yaw drive device 12, a design may be allowed which satisfies the following expression:

$$Mzt_{ALL} + Mzt_{BRK} < |Mzt|_{MAX}, \quad (4)$$

where $Mzt_{ALL}$ is the drive torque totally generated by the yaw drive devices 12, $Mzt_{BRK}$ is the braking torque applied to the nacelle 3 in the high wind speed state, and $|Mzt|_{MAX}$ is the absolute value of the torque applied to the nacelle 3 by a 50-year gust (that is, the maximum torque assumed in the design). When the condition of the formula (4) is acceptable, this allows reducing the total torque to be generated by the yaw drive devices 12, and thereby reducing the size and cost of the yaw drive devices 12.

Figure 6:
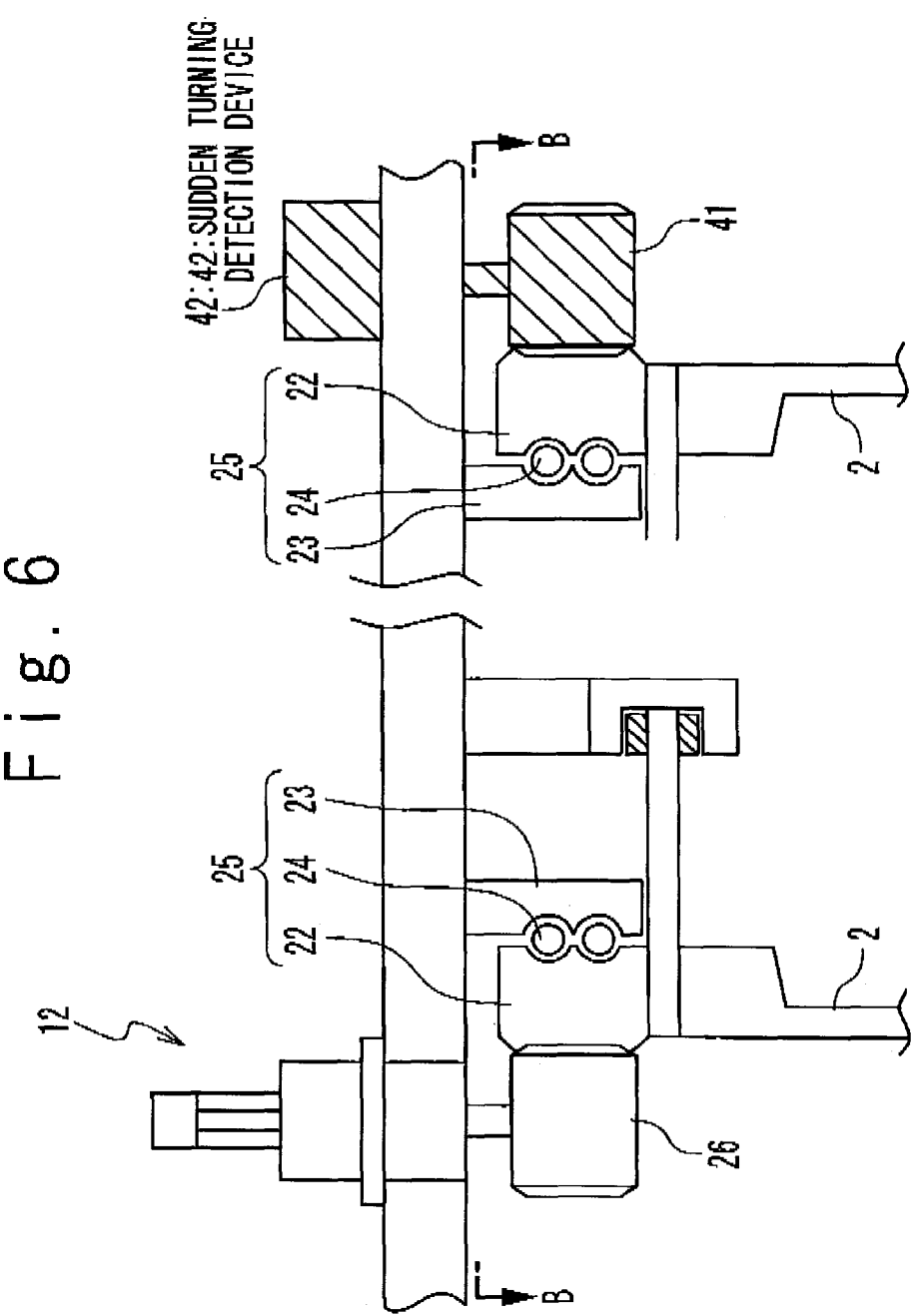
FIG. 6 is a cross sectional view showing the configuration of a yaw control mechanism in another embodiment of the present invention.
Figure 7:
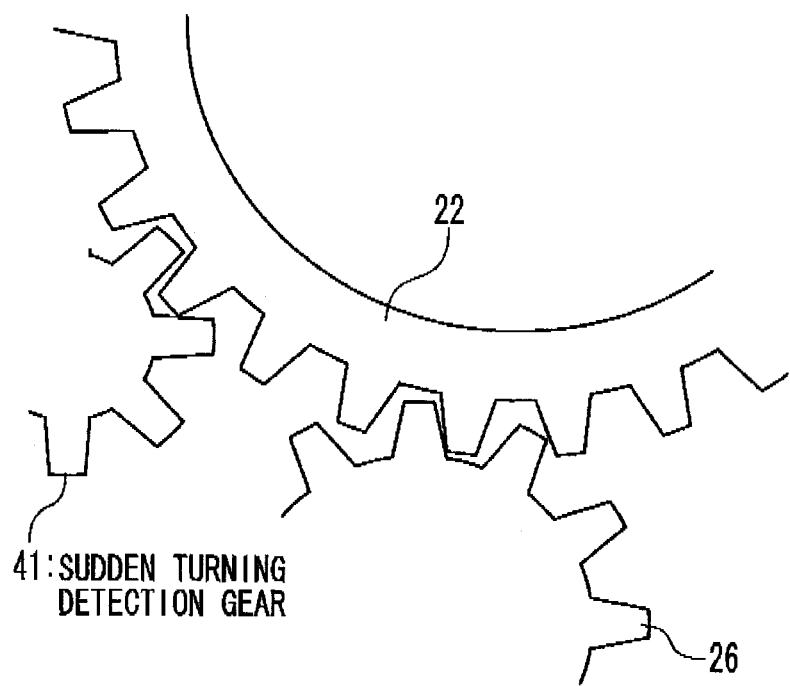
FIG. 7 is a plane view showing the configuration of the yaw control mechanism of FIG. 6.

It should be noted, however, that a situation where the nacelle 3 is pushed back by a strong wind to be suddenly turned may occur, when the yaw drive device 12 is designed so as to satisfy the formula (4). To handle the situation, it is preferable to provide a detection mechanism for detecting the sudden turning of the nacelle 3 and to secure the nacelle 3 when the sudden turning of the nacelle 3 is detected. FIGS. 6 and 7 are views showing one example of the configuration of the detection mechanism for detecting the sudden turning of the nacelle 3. As shown in FIGS. 6 and 7, a sudden turning detection gear 41 engaged to the gear teeth of the outer ring 22 is provided, and the sudden turning detection gear 41 is coupled to a sudden turning detection device 42. The sudden turning detection device 42 detects the rotation of the sudden turning detection gear 41.

When the nacelle 3 is suddenly turned, the sudden turning detection gear 41 is rapidly rotated. When the sudden turning detection device 42 detects a sudden increase in the rotational speed of the sudden turning detection gear 41 (that is, the sudden turning of the nacelle 3), the control system 14 secures the nacelle 3 by operating the motor brakes 29 and the yaw brake calipers 32. The brake torque $Mzt_{BRK\_EMG}$ applied to the nacelle 3 in response to the sudden turning of the nacelle 3 is larger than the brake torque applied to the nacelle 3 in response to the detection of the high wind speed state (the above-mentioned brake torque $Mzt_{BRK}$). Here, $Mzt_{BRK\_EMG}$ is determined to satisfy conditions similar to the above-described formula (1) as follows:

$$Mzt_{ALL} + Mzt_{BRK\_EMG} < |Mzt|_{MAX} < Mzt_{ALL} + Mzt_{BRK\_EMG}. \quad (5)$$

Such operation suppresses the occurrence of the excessive turning of the yaw motor 28 caused by the pushing back of the nacelle 3, even when the yaw drive devices 12 are designed so as to satisfy the formula (4). It would be understood by the person skilled in the art that various types of mechanisms may be used as a mechanism for detecting the sudden turning of the nacelle 3, although the method for detecting the sudden turning of the nacelle 3 by using a gear is described above.

When the reduction of the total torque generated by the yaw drive device 12 is accepted, the number of the yaw drive devices 12 may be decreased to reduce the cost. The reduction of the number of the yaw drive devices 12 is an effective method for reducing the cost. When the number of the yaw drive devices 12 is reduced, however, a load acting each of the yaw drive devices 12 when a wind load has acted to the nacelle 3 in the turning of the nacelle 3 increases, and the output torque to be outputted by each of the yaw drive devices 12 to achieve the yaw turning over the load also increases. On this occasion, the use of motors that are not subjected to a torque control as the yaw motors 28 of the yaw drive devices 12 (for example, induction motors operated under a speed control) may result in that the yaw motors 28 output a torque up to the output limitation thereof, and consequently the mechanisms related to the yaw turning (for example, the gear provided to the outer ring 22, the pinion gear 26, and the reducer 27) may be mechanically damaged.

Figure 8:
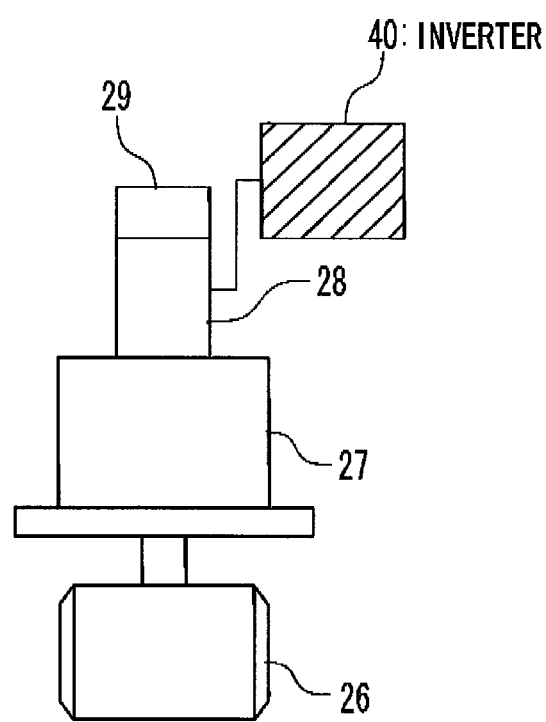
FIG. 8 is a conceptual view showing the configuration of a yaw control mechanism in still another embodiment of the present invention.

To avoid the damage of the mechanisms related to the yaw turning, which may be caused by the excess of the output torque of the yaw motors 28, it is preferable to provide a torque limitation mechanism for limiting the output torque of the yaw motors 28 to a predetermined torque or less. The torque limitation mechanism may be a mechanical mechanism or an electric mechanism. As illustrated in FIG. 8, one approach is to drive the yaw motors 28 by using inverters 40 and to carry out the torque control of the yaw motors 28 by using the inverters 40.

Figure 9:
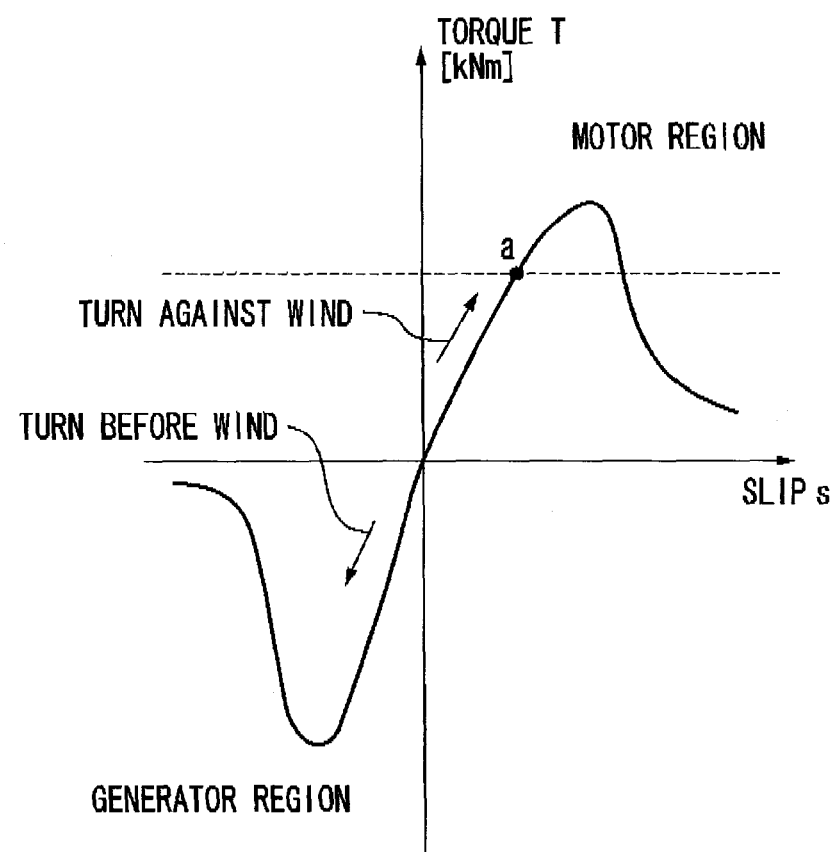
FIG. 9 is a graph showing a slip-output torque curve of the yaw motor in a case when an induction motor is used as the yaw motor.

FIG. 9 is a graph showing a relationship between a slip s and the output torque for the case when an induction motor is used as a yaw motor 28. In an induction motor, the output torque is positive when the slip s (the difference obtained by subtracting the rotation speed of the rotor from the synchronization speed) is larger than zero. In this embodiment, the output torque is limited to a torque $T_{LIM}$ corresponding to a point "a" when the output torque is about to exceed the predetermined point "a". Such torque control may be realized by controlling the yaw motors 28 with a vector control.

The invention claimed is:

1. A wind turbine generator, comprising:
   a nacelle mounting a wind turbine rotor;
   a yaw drive device for generating drive force for causing yaw turning of said nacelle;
   a brake mechanism for generating braking force for braking the turning of said nacelle;
   a control system for controlling said yaw drive device and said brake mechanism; and
   a wind speed measurement device for measuring wind speed,
   wherein,
   when detecting occurrence of a high wind speed state based on said wind speed while said nacelle is turned by said yaw drive device to face said wind turbine rotor upwind, said control system provides braking force for said nacelle by using said brake mechanism in response to the detection or the occurrence of said high wind speed state,
   said yaw drive device is configured to generate a drive torque $MZt_{ALL}$ and said brake mechanism is configured to generate a brake torque $Mzt_{BRK}$, and
   said drive torque $MZt_{ALL}$ and said brake torque $Mzt_{BRK}$ satisfy the following relationship for an absolute value of a torque $|Mzt|_{MAX}$ applied to the nacelle:

$$MZt_{ALL}-MZt_{BRK}<|Mzt|_{MAX}<MZt_{ALL}+MZt_{BRK}.$$

2. The wind turbine generator according to claim 1, wherein said control system controls said brake mechanism so as not to apply braking force to said nacelle, when occurrence of the high wind speed state is not detected during the turning of said nacelle.

3. The wind turbine generator according to claim 1, further comprising: a sudden turning detection device for detecting sudden turning of said nacelle caused by wind,
   wherein, when a sudden turning of said nacelle is detected in the turning of said nacelle, said control system controls said brake mechanism so as to apply greater braking force than the braking force applied in response to the detection of the occurrence or said high wind speed state.

4. The wind turbine generator according to claim 1, wherein said yaw drive device includes:
   a yaw motor;
   a turn mechanism for turning said nacelle by using a torque generated by said yaw motor; and
   a torque control device for controlling said torque generated by said yaw motor.

5. A wind turbine generator, comprising:
   a nacelle mounting a wind turbine rotor;
   a yaw drive device for generating drive force for causing yaw turning of said nacelle;
   a brake mechanism for generating braking force for braking the turning of said nacelle;
   a control system for controlling said yaw drive device and said brake mechanism;
   a wind speed measurement device for measuring wind speed; and
   a sudden turning detection device for detecting sudden turning of said nacelle caused by wind,
   wherein, when detecting occurrence of a high wind speed state based on said wind speed while said nacelle is turned by said yaw drive device, said control system provides braking force for said nacelle by using said brake mechanism in response to the detection or the occurrence of said high wind speed state, and
   wherein, when a sudden turning of said nacelle is detected in the turning of said nacelle, said control system controls said brake mechanism so as to apply greater braking force than the braking force applied in response to the detection of the occurrence or said high wind speed state.

* * * * *